(12) United States Patent
Roach (10) Patent No.: US 9,246,946 B2
(45) Date of Patent: Jan. 26, 2016

(54) SYSTEM AND METHOD FOR PROVIDING CUSTOMIZED RESPONSE MESSAGES BASED ON REQUESTED WEBSITE

(71) Applicant: NETSWEEPER INC., Guelph (CA)

(72) Inventor: Perry J. Roach, Guelph (CA)

(73) Assignee: NETSWEEPER (BARBADOS) INC., St. Michael (BB)

( * ) Notice: Subject to any disclaimer, the term of this patent is extended or adjusted under 35 U.S.C. 154(b) by 0 days.

(21) Appl. No.: 14/043,407

(22) Filed: Oct. 1, 2013

(65) Prior Publication Data

US 2014/0033270 A1 Jan. 30, 2014

Related U.S. Application Data

(63) Continuation of application No. 13/119,983, filed as application No. PCT/IB2010/001710 on Jun. 23, 2010, now Pat. No. 8,578,453.

(60) Provisional application No. 61/270,351, filed on Jul. 7, 2009.

(51) Int. Cl.
*G06F 7/04* (2006.01)
*H04L 29/06* (2006.01)
*G06F 17/30* (2006.01)

(52) U.S. Cl.
CPC .......... *H04L 63/20* (2013.01); *G06F 17/30876* (2013.01); *G06F 17/30887* (2013.01); *H04L 63/105* (2013.01)

(58) Field of Classification Search
CPC .................................................. G06F 17/3089
See application file for complete search history.

(56) References Cited

U.S. PATENT DOCUMENTS

| | | | |
|---|---|---|---|
| 5,848,412 A * | 12/1998 | Rowland et al. | |
| 7,194,464 B2 * | 3/2007 | Kester et al. | |
| 7,437,427 B1 * | 10/2008 | Veeraraghavan et al. | 709/217 |
| 8,205,167 B2 * | 6/2012 | Kang | G06Q 30/02 705/14.4 |
| 2002/0046109 A1 * | 4/2002 | Leonard et al. | 705/14 |
| 2004/0059801 A1 * | 3/2004 | Nakanishi et al. | 709/220 |
| 2004/0078476 A1 * | 4/2004 | Razdow et al. | 709/229 |
| 2005/0027820 A1 * | 2/2005 | O'Laughlen et al. | 709/217 |
| 2005/0144297 A1 * | 6/2005 | Dahlstrom et al. | 709/229 |
| 2005/0235044 A1 * | 10/2005 | Tazuma | G06F 17/30887 709/217 |
| 2006/0095779 A9 * | 5/2006 | Bhat | H04L 67/02 713/182 |
| 2006/0212934 A1 * | 9/2006 | Cameron et al. | 726/12 |
| 2009/0112967 A1 * | 4/2009 | Amano et al. | 709/201 |
| 2012/0226912 A1 * | 9/2012 | King | 713/183 |

OTHER PUBLICATIONS

Parent U.S. Appl. No. 13/119,983, filed Jun. 23, 2010; entitled: System and Method for Providing Customized Response Messages Based on Requested Website; now Issued U.S. Pat. No. 8,578,453.

* cited by examiner

*Primary Examiner* — Fatoumata Traore
*Assistant Examiner* — Khoi Le
(74) *Attorney, Agent, or Firm* — Perry + Currier Inc.

(57) ABSTRACT

The invention describes a system, method and computer product to regulate user access to websites. The system receives a URL request by a user corresponding to a website that the user wishes to access. Thereafter, the system determines the associated group of the user and the associated category of the website. Subsequently, a message to be displayed to the user is determined based on the associated group of the user and the associated category of the website. The message is included in a block page and then displayed to the user.

22 Claims, 9 Drawing Sheets

FIG. 1

| IP Address | User Name | Location | Age |
|---|---|---|---|
| 172.15.253.1 | Shevchenko | Ukraine | 50 |
| 172.15.253.2 | Arshavin | Ukraine | 14 |
| 171.15.253.1 | Berbatov | Russia | 26 |
| 172.15.253.3 | Levchenko | Ukraine | 48 |
| 171.15.253.2 | Chekov | Russia | 14 |

FIG. 2

| User Name | Location | Age | Group ID |
|---|---|---|---|
| Shevchenko | Ukraine | 50 | 15 |
| Arshavin | Ukraine | 16 | 17 |
| Berbatov | Russia | 26 | 16 |
| Levchenko | Ukraine | 48 | 15 |
| Chekov | Russia | 14 | 17 |

FIG. 3A

| URL Request | Category ID |
|---|---|
| http://www.espn.com | Sports |
| http://www.bbc.com | News |
| http://www.soccernet.com | Sports |
| http://www.virus.com | Infected |
| http://www.notforteens.com | Harmful |

FIG. 3B

| User Name | Group ID | URL Request | Category ID | Message Policy |
|---|---|---|---|---|
| Shevchenko | 15 | http://www.notforteens.com | Harmful | User is an adult, allow access to the site |
| Arshavin | 17 | http://www.notforteens.com | Harmful | User is a minor, restrict access to site |

FIG. 3C

| Group ID | Category | Message Policy | Message | Advisory URL |
|---|---|---|---|---|
| 15 | Harmful | User is an adult, allow access to the site | Enjoy your time on the internet provided by HW telecom | http://www.alcohol.com |
| 30 | Harmful | User is a minor, restrict access to site | The site contains harmful content and is restricted | http://www.hobbies4teens.com |

SYSTEM AND METHOD FOR PROVIDING CUSTOMIZED RESPONSE MESSAGES BASED ON REQUESTED WEBSITE

BACKGROUND

The present invention relates, in general, to Internet access management. More specifically, the invention relates to a system and method for displaying customized messages to the user based on a requested website.

The Internet usage in various establishments, such as educational institutions, government and corporate offices, and individual households, has witnessed a rapid growth in the past decade and has become an important tool in daily life. This has increased the probability of its misuse, thus making it necessary to regulate it. Regulation is required for different purposes—to protect minors from inappropriate content, such as pornographic websites; to stop employees at work from accessing sites unrelated to work; to protect confidential information; and to protect unsuspecting users of the Internet from accessing harmful content, such as viruses, trojans, and the like.

There are several solutions available in the market to filter and control the Internet access of a user. These solutions allow network administrators to block access to websites based on predefined parameters. Based on these parameters, various websites are grouped into different categories, such as "Social Networking," "Streaming media," "Sports," and the like. These solutions block the websites which the user is not eligible to visit and provide a generic deny page stating only the organization's policy and the category under which the website was blocked. However, the deny page displayed by various solutions to the users can be used further to guide and help the users after they are denied access to the requested website.

SUMMARY

The present invention provides a method, system, and computer program product for generating an advisory message to be displayed to a user requesting access to a website over the internet. The method includes the steps of verifying the user on the basis of a pre-defined set of user credentials. After successful verification, the method includes the step of verifying an access level of the user, wherein the access level is pre-defined by an administrator. Thereafter, the user requested website is categorized on the basis of a category identifier. The method then includes the step of determining a message policy on the basis of the access level of the user and the category identifier. Subsequently, an advisory message is displayed to the user on the basis of the access level of the user, the category identifier, and the message policy.

The system includes a gateway server for receiving website access requests from a user. The gateway server is connected to an interceptor server and all the requests are sent to the interceptor server. The interceptor server verifies the user on the basis of a pre-defined set of user credentials. Based on the verification, the interceptor server sends the requested website details and the user credentials to a policy lookup server. The policy lookup serve checks an access level of the user and a category identifier of the user requested website. Based on this, the policy lookup server identifies a message policy applicable to the requested website. Thereafter, the policy lookup server sends the user access level details along with the user credentials, the category identifier of the requested website and the applicable policy to the message server. The message server provides an advisory message to be displayed to the user, wherein the message server determines at least one advisory message based on the received user credentials, the category identifier of the requested website, and the received message policy.

The present invention has various advantages. An advantage of the present invention is the regulation of access to websites over the Internet. Another advantage of the present invention is blocking access to websites which are deemed not suitable for various users based on one or more parameters. Yet another advantage of the invention is the ability of the system to display one or more advisory messages to a user based on the type of requested website. The present invention facilitates customization of messages to be provided on a block page to a user accessing a website. These customized messages help the user in determining their next course of action and provide the user with useful information. These messages also help in facilitating better interaction with the user, knowing user preferences that can be used to provide better Internet experience. Further, the invention facilitates generation of revenues through sponsor advertisements displayed on the block page. Further, the invention allows provision of the customized messages to the user through a third-party Internet access management system. Also, the invention facilitates reporting of suspicious activity by the user and any infected content in a website to a system administrator.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DETAILED DESCRIPTION OF THE INVENTION

The invention describes a system, method and computer program product to control user access to websites. The system receives a uniform resource locator (URL) corresponding to a website requested by a user. Thereafter, the system determines an associated group of the user based on a predefined grouping of users, and category of the website based on a predefined categorization of websites. Further, a message policy is determined for the request from a set of predefined message policies. Subsequently, a 'block' page is created and displayed to the user with the message associated with the message policy.

Figure 1:
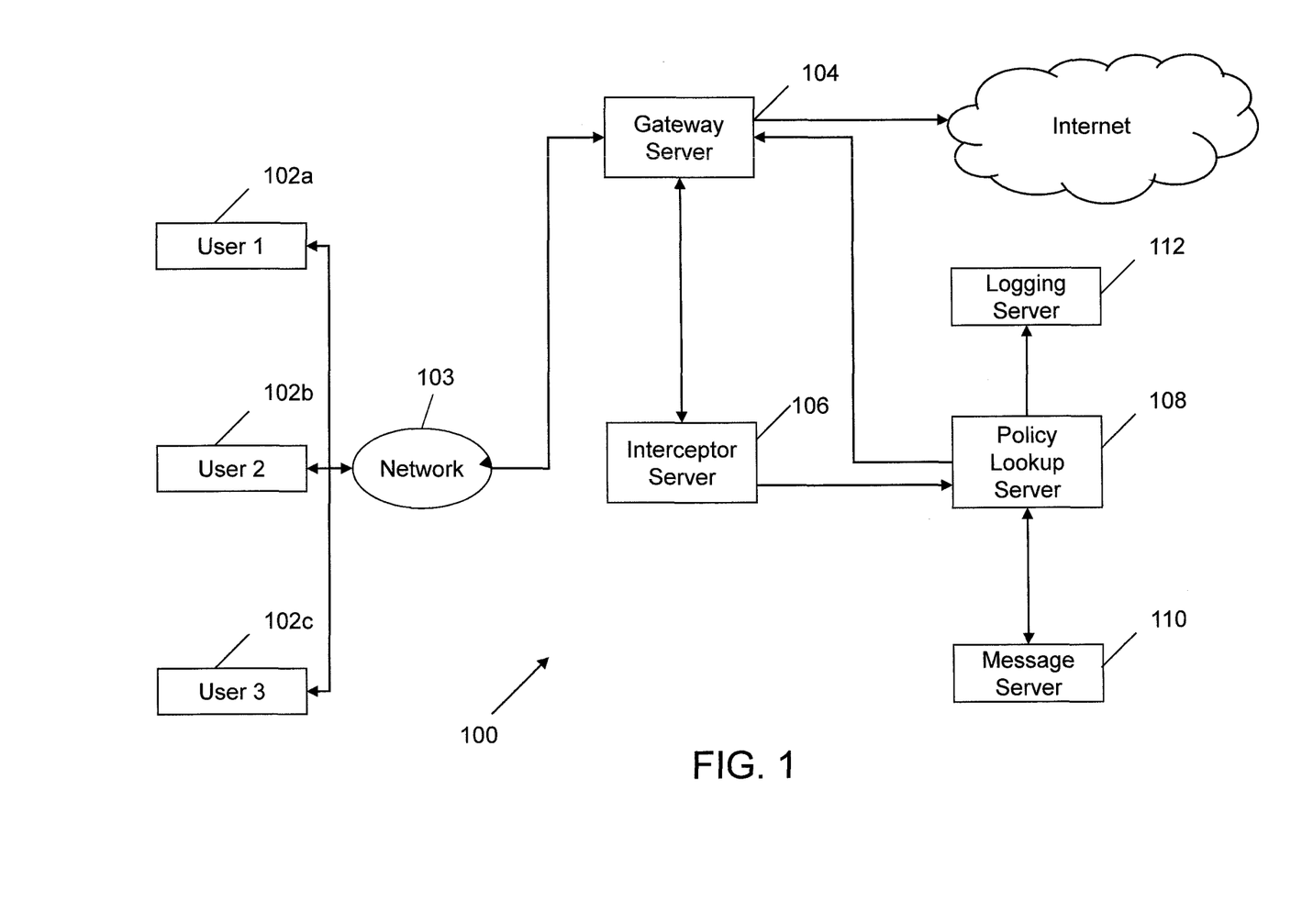
FIG. 1 is a block diagram illustrating an environment, in accordance with an embodiment of the invention.

FIG. 1 is a block diagram illustrating an environment 100, in accordance with an embodiment of the invention. Environment 100 may include: multiple users 102a, 102b, and 102c; a network 103; a gateway server 104; an interceptor server 106; a policy lookup server 108; a message server 110; and a logging server 112. The blocks illustrated in FIG. 1 may comprise hardware, software, or a combination thereof. Users 102a, 102b, and 102c, hereinafter may also be collectively referred to as "users".

In various embodiments of the invention, user 102a may access the Internet through a computer, a mobile phone, a Personal Digital Assistant (PDA), and any other Internet-enabled device.

In various embodiments of the invention, user 102a may access the Internet through a web browser installed in the above mentioned devices.

In an embodiment of the invention, gateway server 104 receives a URL request from user 102a to access a website. In another embodiment of the invention, gateway server 104 receives a URL request from user 102a through network 103 to access a website. Network 103 may be a Local Area Network (LAN). Prior to enabling user 102a to access the website, gateway server 104 redirects the URL request to interceptor server 106.

Interceptor server 106 authenticates user 102a based on access credentials associated with user 102a. In one embodiment, credentials are sent to interceptor server 106 by gateway server 104. In an embodiment of the invention, the access credentials may be an IP address of a device used by user 102a to access the Internet. In another embodiment of the invention, the access credentials may be a username and a password of user 102a.

Interceptor server 106 verifies the access credentials by matching them with at least one of pre-stored user details. In various embodiments of the invention, interceptor server 106 may maintain a database of the user details. Various examples of the user details include, but are not limited to: organizational details of user 102a; IP address; and demographic details, such as name, sex, location, ethnicity, and age, of user 102a.

Figure 2:
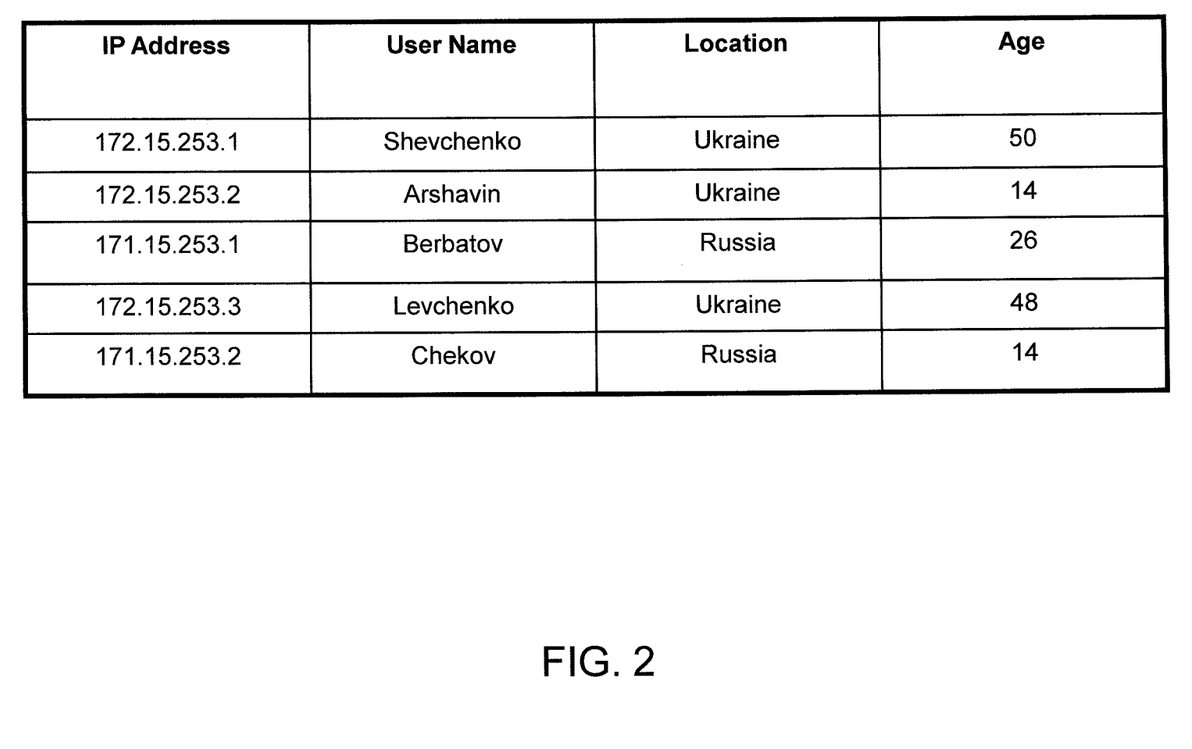
FIG. 2 illustrates an exemplary table depicting various user details maintained by an interceptor server.

FIG. 2 illustrates an exemplary table depicting various user details maintained by interceptor server 106. An example of interceptor server 106 is a Remote Authentication Dial in User Service (RADIUS) server that uses an authentication, authorization, and accounting (AAA) process to authenticate the user. The protocol used by interceptor server 106 may include the RADIUS protocol, and the authentication schemes may include password authentication protocol (PAP), challenge-handshake authentication protocol (CHAP), or extensible authentication protocol (EAP).

Further, if user 102a is authenticated, interceptor server 106 sends at least one of the user details corresponding to the access credentials along with the URL mentioned in the URL request to policy lookup server 108.

Policy lookup server 108 then determines a group ID of user 102a based on the at least one user detail received from interceptor server 106. In various embodiments of the invention, the group ID corresponding to at least one user detail is determined from a pre-stored list of group IDs. Further, in the pre-stored list of group IDs, a group ID is assigned to a group of users based on at least one of the user associated details, such as age, sex, ethnicity, location, and the like.

Figure 3A:
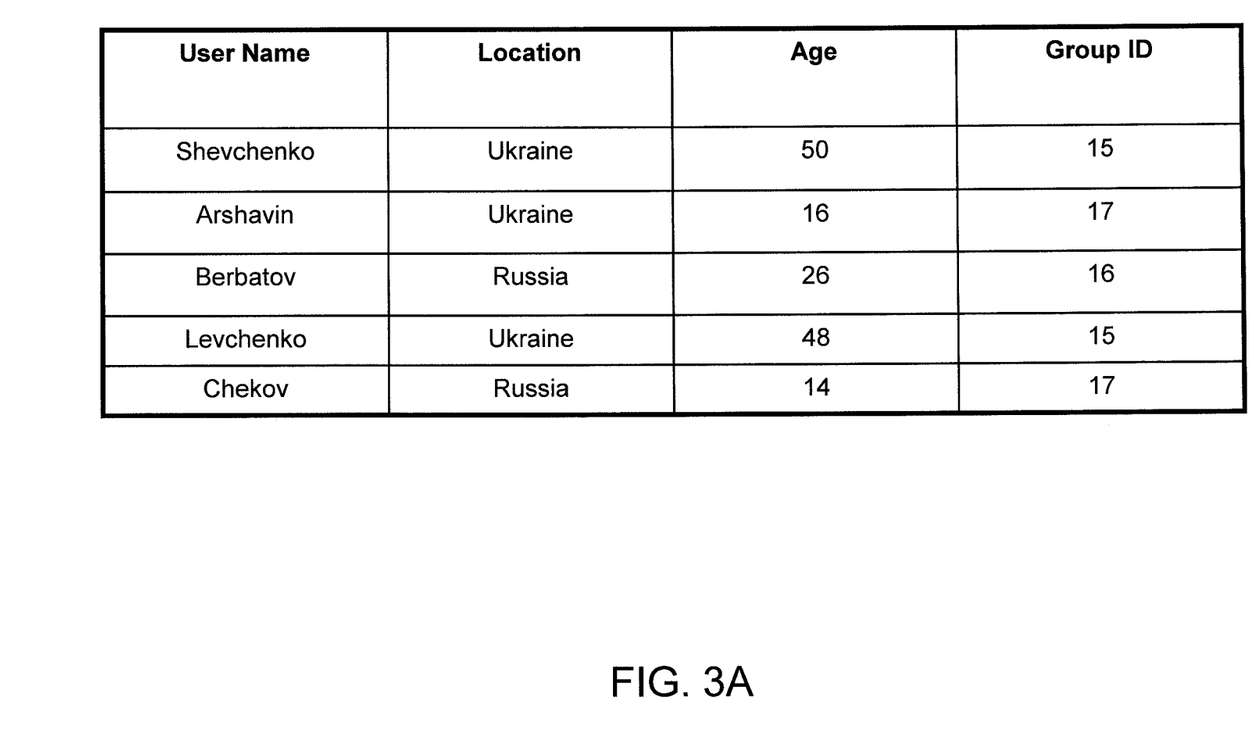
FIGS. 3A, 3B and 3C are tables illustrating a pre-stored list of group IDs assigned to the user based on the associated age, category IDs corresponding to the websites, and message policies for the user based on the corresponding group ID and category ID, in accordance with the exemplary embodiment of the invention.

In an exemplary embodiment of the invention, FIG. 3A illustrates a table, including a pre-stored list of group IDs assigned to the user based on the associated age. For example, according to FIG. 3A, if the user is below 20 years of age, the pre-assigned group ID can be '17'. In various embodiments of the invention, the group IDs in the pre-stored list of group Ds may be predefined by a network administrator. Further, the list of group IDs is stored at policy lookup server 108. In various embodiments of the invention, the group ID may be denoted by at least one of an alphabet, a numeric character, or an alphanumeric character. The group ID indicates the access level of the user. In an embodiment of the invention, the group ID is ascertained as one parameter to determine if the user should be granted access to the requested URL.

Policy lookup server 108 also determines a category ID corresponding to the website requested. In an embodiment of the invention, the category ID corresponding to the website is determined from a pre-stored list of category IDs. Further, in the pre-stored list of category ID, a category ID is assigned to a group of websites based on at least one of the content of a website, location of the website, rating of the website by a third party, and the like. Various examples of the categories may include, but are not limited to, religious, music, sports, infected, harmful, pornography, alcohol and tobacco.

Figure 3B:
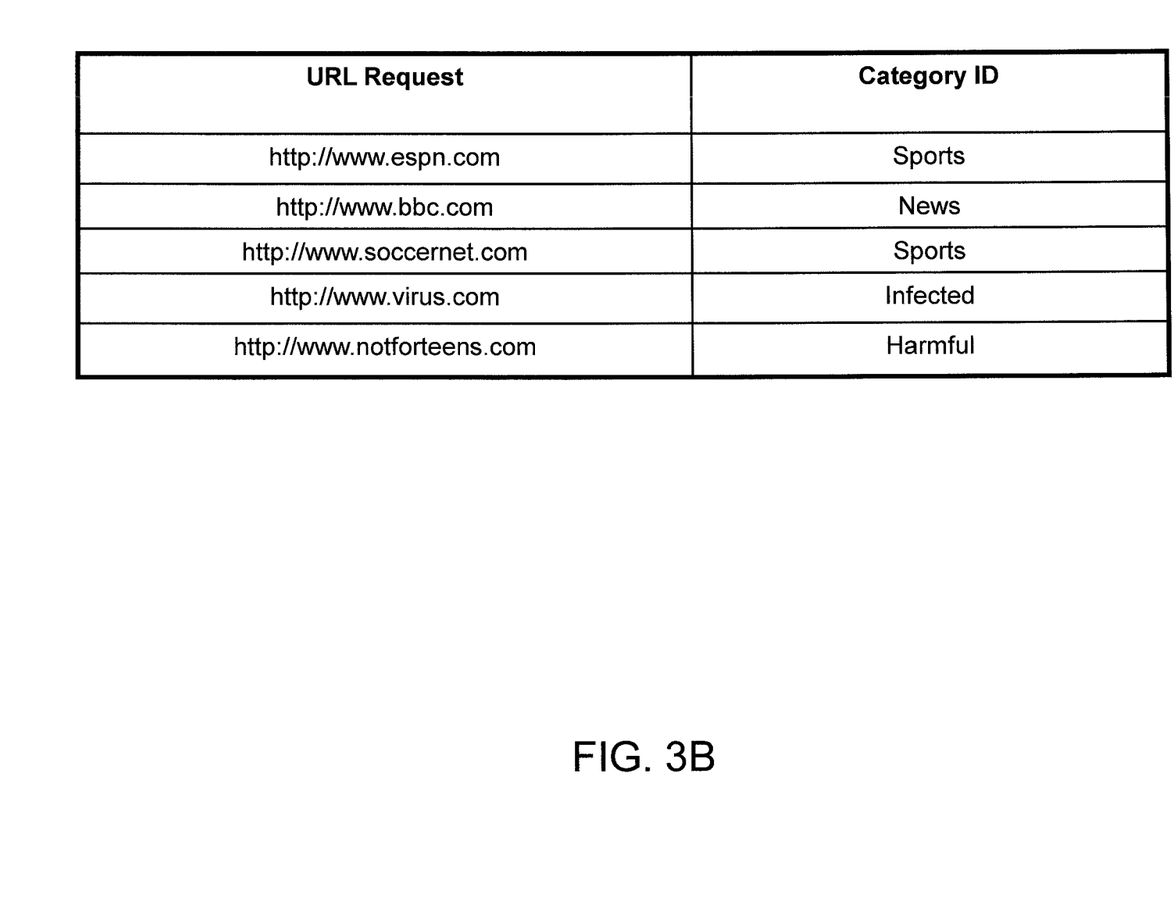

In an exemplary embodiment of the invention, FIG. 3B illustrates a table that includes a pre-stored list of category IDs corresponding to the websites. In various embodiments of the invention, the category IDs in the stored list is predefined by the network administrator. Further, the list of category IDs is stored at policy lookup server 108. In various embodiments of the invention, the category ID may be at least one of an alphabet, a numeric character, or an alphanumeric character.

In an embodiment of the invention, when the URL corresponding to the website requested by user 102a is not available in the pre-stored list of websites, policy lookup server 108 categorizes the website into one of the pre-stored categories dynamically based on neural-network- or artificial intelligence-based applications.

Figure 3C:
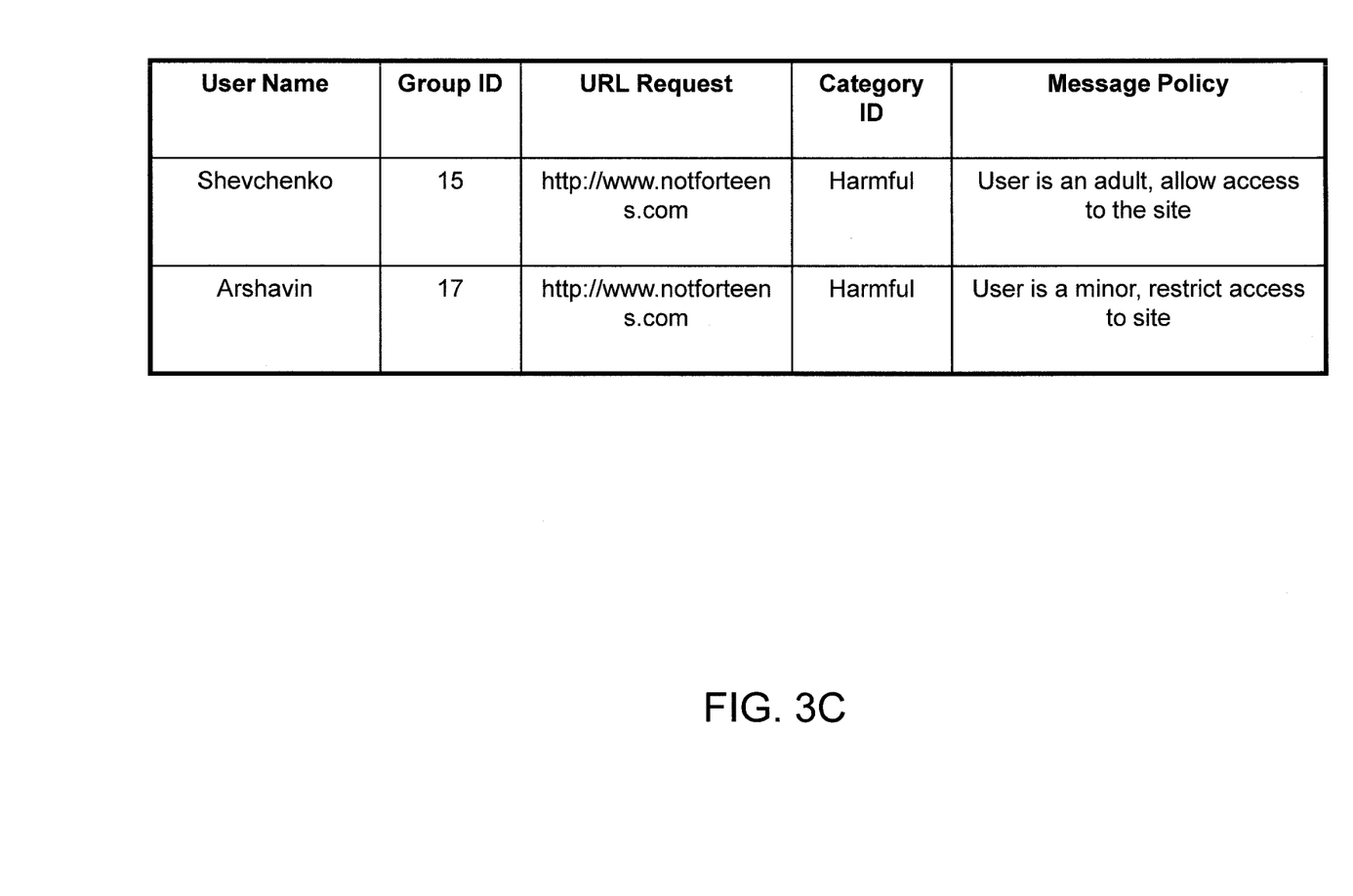

Thereafter, policy lookup server 108 determines a message policy corresponding to the URL request based on the determined category ID and the determined group ID from a pre-stored list of message policies. Further, in the pre-stored list of message policies, a message policy is assigned to each combination of the group ID and the category ID. In various embodiments of the invention, the message policies may be predefined by the network administrator. In an exemplary embodiment of the invention, FIG. 3C illustrates a table that includes a pre-stored list of message policies for users based on the corresponding group ID and category ID.

Subsequently, policy lookup server 108 sends the determined group ID, the determined category ID, and the determined message policy to message server 110. Message server 110 determines at least one of a message and a predefined URL corresponding to the URL request based on the received group ID, the received category ID, and the received message policy. In various embodiments of the invention, at least one of the message and the predefined URL is determined from a pre-stored list of messages and predefined URLs.

The pre-stored list of messages and predefined URLs includes messages and predefined URLs corresponding to the combination of group IDs, the category IDs, and the message policies. In various embodiments of the invention, the message may indicate denial of access to a user, indicate provision of limited access to the user, and may display a warning to the user of possible consequences of accessing the website, an advertisement message from a sponsor, and the like. In various embodiments of the invention, the predefined URL may be the URL of a sponsor website, a URL of an advisory site, a URL of an appropriate website to which the user is redirected, and the like. Further, the pre-stored list of messages and predefined URLs may be customized based on the characteristics of user 102a and content of the website requested. In various embodiments of the invention, the message and the predefined URLs may be customizable by the network administrator. In another embodiment of the invention, the message and the predefined URLs may be pre-stored by a third party. Further, the list of messages and predefined URLs is stored at message server 110.

Figure 4:
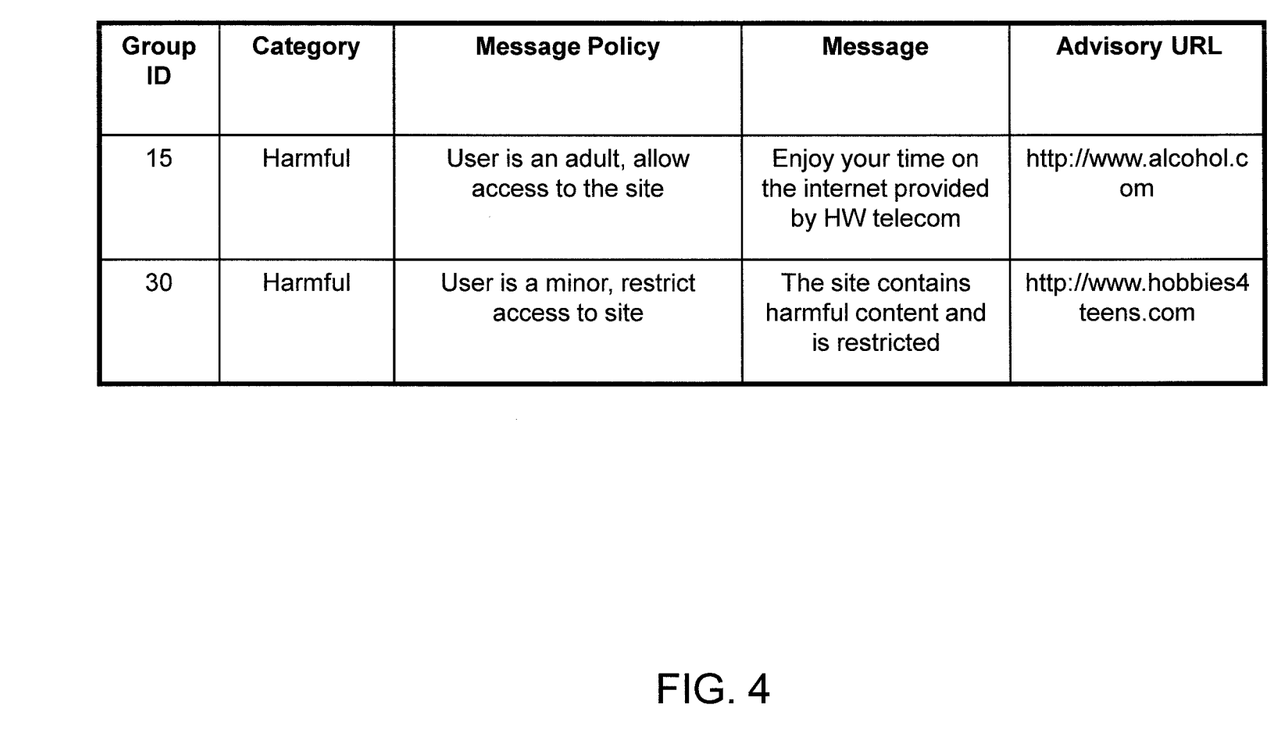
FIG. 4 is a table illustrating a pre-stored list of messages and predefined URLs, in accordance with the exemplary embodiment of the invention.

In an exemplary embodiment of the invention, FIG. 4 illustrates a table including different messages and predefined URLs for different users corresponding to the same requested website based on the category ID and the group ID. In the current example, the messages depicted for the different users are customized based on the age of the user and the requested website.

After message server 110 identifies at least one of the messages and the predefined URL corresponding to the received group ID, the category ID, and the message policy, message server 110 retrieves the location of the message and the predefined URL. Thereafter, message server 110 sends the retrieved location to policy lookup server 108, which retrieves the message and the predefined URL from message server 110 based on the received location information. Policy lookup server 108 then creates a block page with the received message and the received predefined URL. Policy lookup server 108 sends the location of the created block page to gateway server 104. Subsequently, gateway server 104 forwards the location of the block page to the device of user 102a. A web browser installed in the device retrieves the block page from the specified location and displays it to user 102a. For example, policy lookup server 108 sends a 'HTTP 302' response to gateway server 104. The location of the block page is contained in the header of the HTTP 302 response. In an embodiment of the invention, the predefined URL on the block page may be presented in the form of a banner advertisement.

In another embodiment of the invention, policy lookup server 108, based on the determined message policy corresponding to the URL, sends a request to logging server 112 for creating a log report of the URL request. The log report may include the website mentioned in the URL request, its category ID, the group ID of user 102a, and associated user details. Logging server 112 may provide the log report to the user or the network administrator.

Figure 5:
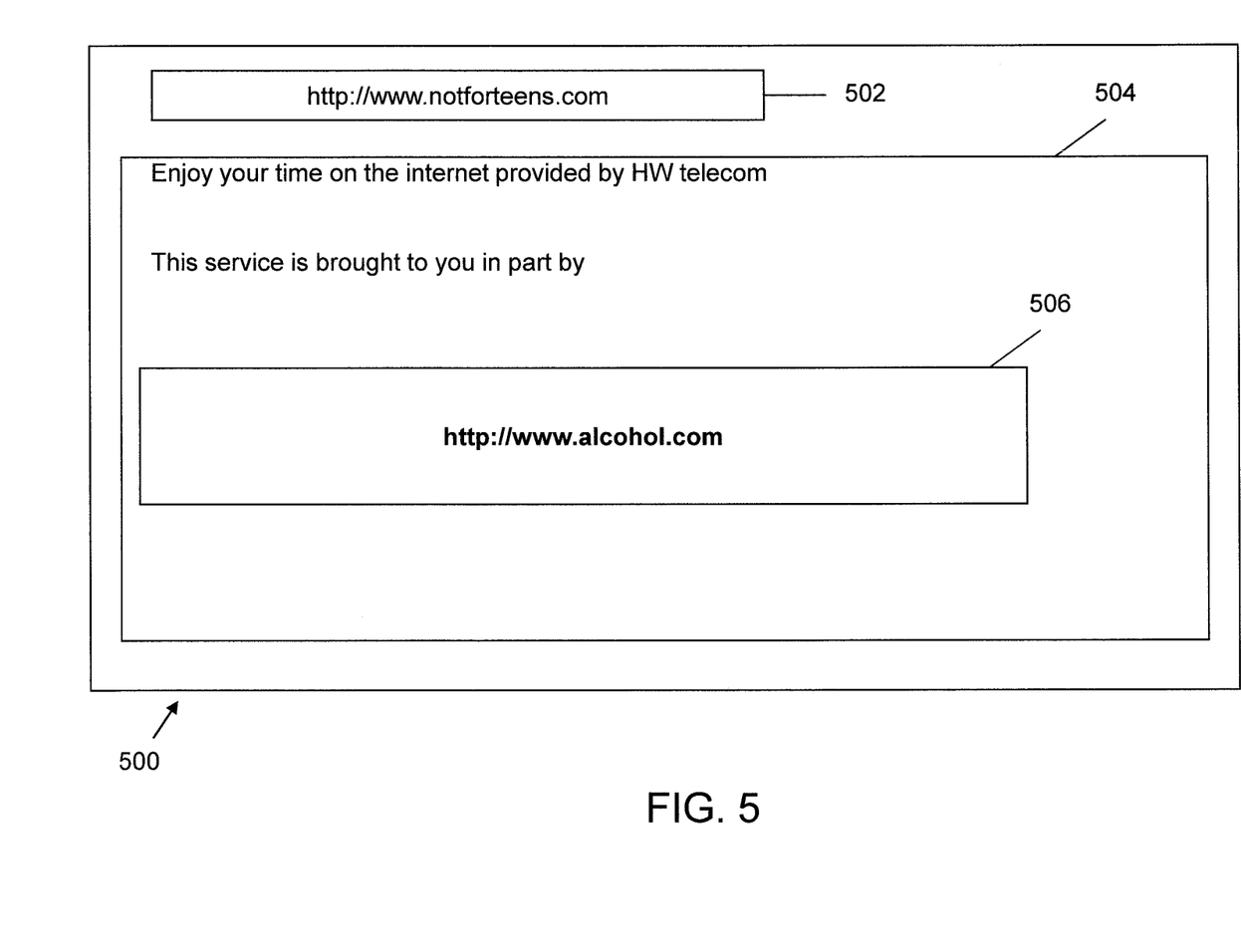
FIG. 5 is an exemplary snapshot depicting a block page containing a message and a predefined URL displayed to a user, in accordance with the exemplary embodiment of the invention.

In accordance with an exemplary embodiment of the invention, a user, such as user 102a, sends a URL request containing an URL"http://www.notforteens.com." Further, access credentials of user 102a may be an IP address, such as "172.15.253.1." Gateway server 104 then redirects the URL request to interceptor server 106, which authenticates the user based on the IP address and determines at least one of the associated user details, such as username as "Shevchenko," age as "50," and location as "Ukraine," and predefined access rights from the stored list of user details (as illustrated in FIG. 2). Interceptor server 106 then sends at least one of the user details, such as age "50," to policy lookup server 108, which determines a group ID of the user based on age "50" as "15" and a category ID as "Harmful" based on the requested website and a corresponding message policy as "User is an adult, allow access to the site" from its pre-stored list of group IDs (FIG. 3A), category IDs (FIG. 3B), and message policies (FIG. 3C). Policy lookup server 108 sends the determined group ID, category ID, and message policy to message server 110. Message server 110, based on the received details, determines the corresponding message, such as "Enjoy your time on the Internet provided by HW telecom," and predefined URL "http://www.alcohol.com" from the pre-stored list of messages and predefined URLs (FIG. 4) respectively. Thereafter, message server 110 sends the location of the message and the predefined URL to policy lookup server 108, which retrieves the message and the predefined URL. Policy lookup server 108 then creates a block page with the received message and the received predefined URL. Policy lookup server 108 sends the location of the created block page to gateway server 104. Subsequently, gateway server 104 forwards the location of the block page to the device of user 102a. A web browser installed in the device retrieves the block page from the specified location and displays it to user 102a. The exemplary block page displayed to user 102a is depicted in FIG. 5. 502 depicts the URL "http://www.notforteens.com" corresponding to the website requested by user 102a. Further, 504 depicts the message displayed corresponding to the URL request. Furthermore, 506 depicts the predefined URL "http://www.alcohol.com" corresponding to the URL request.

Examples of environment 100 may include an organization or an educational institution, where the users are employees who are connected to the Internet through gateway server 104. Another example of environment 100 may include users, such as a group of individuals using the Internet through an Internet service provider. Yet another example of environment 100 may include users, such as individuals connecting to a virtual private network (VPN). Further, it may be apparent to any person skilled in the art that, though the exemplary ways of storing various lists as described above is illustrated with the help of tables, there may be various other data structure formats for storing the lists.

Figure 6A:
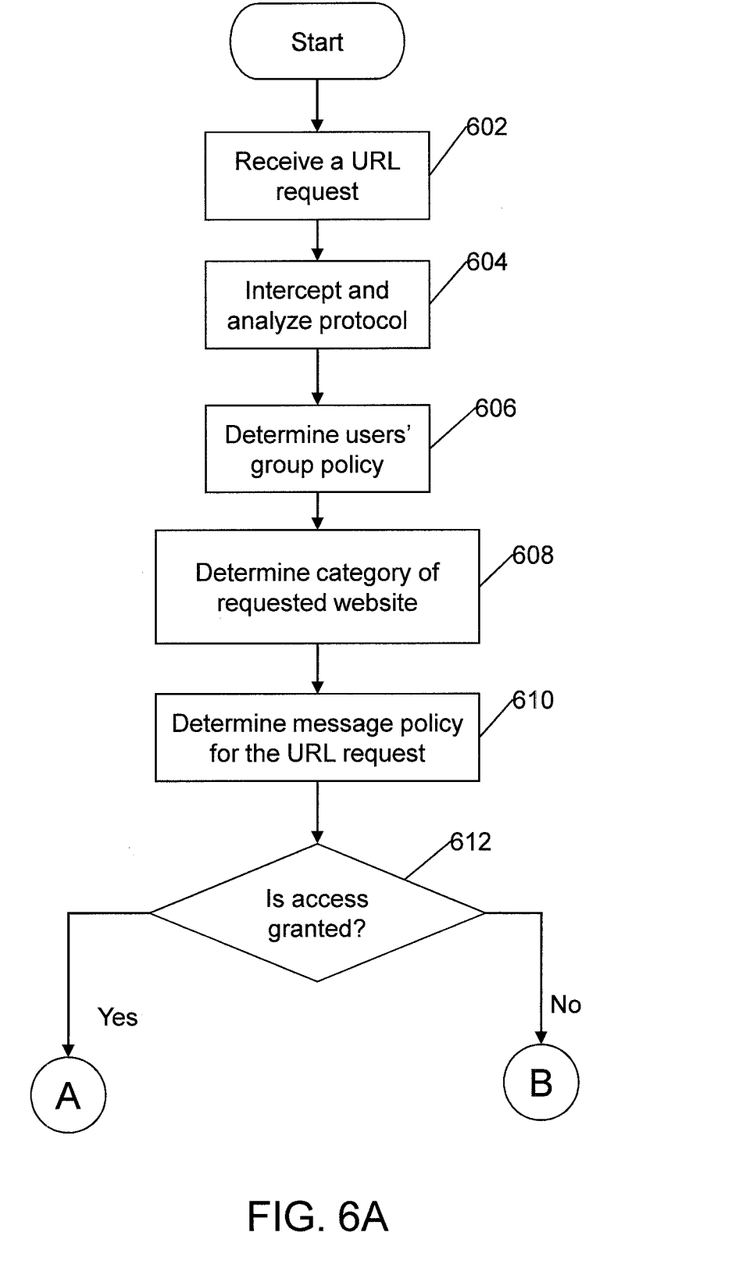
FIGS. 6A and 6B are flowcharts illustrating a method for providing a message to a user on a block page, in accordance with an embodiment of the invention.
Figure 6B:
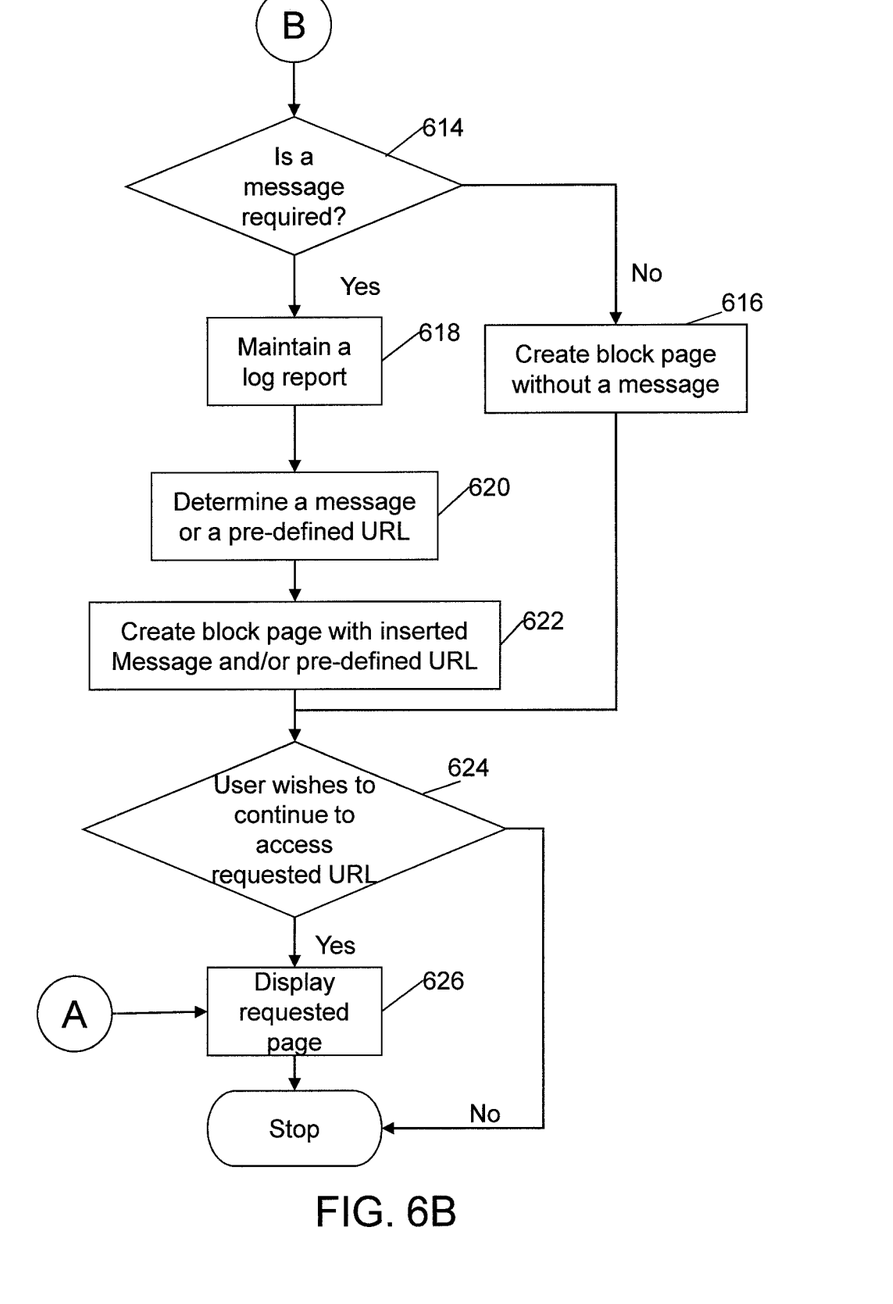

FIGS. 6A and 6B are flowcharts illustrating a method for providing a message to a user, such as user 102a, on a block page, in accordance with an embodiment of the invention.

At 602, a URL request sent by the user to access a website is received. In an embodiment of the invention, the URL request is received by a server. In various embodiments of the invention, user 102a may access the Internet through a computer, a mobile phone, a Personal Digital Assistant (PDA), and any other Internet-enabled device.

At 604, the URL request is intercepted and its header information is analyzed. This is primarily performed to determine the access level credentials, and to authenticate the user by matching at least one of associated user details with the access credentials. The details associated with the access credentials and the user details of the user have been explained in detail in conjunction with FIG. 1.

At 606, an associated group ID of the user is determined to ascertain the users' group policy. At 608, an associated category ID of the website is determined and at 610, an associated message policy of the URL request is determined based on the associated group ID and the associated category ID of the website.

At 612, it is determined whether the user is allowed to access the website corresponding to the URL or not. In an embodiment of the invention, the access to the website is determined based on the group ID, the category ID, and the message policy. At 612, if it is determined that the user is allowed to access the website, then, at 626, the user is permitted to access the content of the website corresponding to the URL.

If the user is not allowed to access the web site, then at 614, it is determined if a message is required to be displayed to the user. In an embodiment of the invention, whether the message is required to be displayed to the user or not is determined based on the group ID, the category ID, and the message policies.

At 614, if it is determined that a message is not required to be displayed to the user, then at 616, a block page without the message is created and displayed to the user. In an embodiment of the invention, the block page with the message includes the URL originally requested by the user.

However, if, at 614, it is determined that a message is required to be displayed to the user, then, at 618, a log report of the requested website is created.

In an embodiment of the invention whether a log report is to be created or not is determined based on the group ID, the category ID, and the message policy. Then, at 620, at least one of an associated message and a predefined URL are determined. Thereafter, at 622, a block page with the message and/or the predefined URL is created and displayed to the user. In an embodiment of the invention, the block page with the message may further include the URL originally requested by the user. The URL corresponding to the requested website is included in the block page based on an associated message policy. For example, the requested website may contain inappropriate content, such as alcohol and tobacco. However, if the determined message policy mentions the user is an adult, it is then left to the user's discretion to decide whether he still wishes to access the website or not. Thus, at 624, if the user wishes to access the requested website displayed in the block page, then at 626, the user is allowed to access the requested website.

In accordance with the present invention, a system, method and computer program product for providing customized message responses based on requested websites has numerous advantages. For example, the present invention facilitates customization of messages to be provided on a block page to a user accessing a website. These customized messages help the user in determining their next course of action and provide the user with useful information. These messages also help in facilitating better interaction with the user, knowing user preferences that can be used to provide better Internet experience. Further, the invention facilitates generation of revenues through sponsor advertisements displayed on the block page. Further, the invention allows provision of the customized messages to the user through a third-party Internet access management system. Also, the invention facilitates reporting of suspicious activity by the user and any infected content in a website to a system administrator.

The system for providing customized messages to a user based on requested website, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system typically comprises a computer, an input device, and a display unit. The computer further comprises a microprocessor, which is connected to a communication bus. The computer also includes a memory, which may include Random Access Memory (RAM) and Read Only Memory (ROM). The computer system also comprises a storage device, which can be a hard disk drive or a removable storage drive such as a floppy disk drive, an optical disk drive, etc. The storage device can also be other similar means for loading computer programs or other instructions into the computer system. The computer system also includes a communication unit, which enables the computer to connect to other databases and the Internet through an Input/Output (I/O) interface. The communication unit also enables the transfer as well as reception of data from other databases. The communication unit may include a modem, an Ethernet card, or any similar device which enable the computer system to connect to databases and networks such as Local Area Network (LAN), Metropolitan Area Network (MAN), Wide Area Network (WAN) and the Internet. The computer system facilitates inputs from a user through an input device, accessible to the system through an I/O interface.

The computer system executes a set of instructions that are stored in one or more storage elements in order to process the input data. The storage elements may also hold data or other information as desired. The storage element may be in the form of an information source or a physical memory element present in the processing machine.

The present invention may also be embodied in a computer program product for providing customized messages to a user based on requested website. The computer program product includes a computer usable medium having a set of program instructions comprising a program code for searching one or more documents in Local Area Network (LAN). The set of instructions may include various commands that instruct the processing machine to perform specific tasks such as the steps that constitute the method of the present invention. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention.

What is claimed is:

1. A method of applying policy to website content requests, the method comprising:
obtaining, with at least one server, a uniform resource locator (URL) request originating from a requesting computer of a plurality of user computers, the at least one server obtaining the URL request from a gateway server of an Internet service provider that provides Internet access to the plurality of user computers;
performing policy lookup on the URL request to determine whether access to a URL contained in the URL request by the requesting computer is to be denied, the policy lookup referencing stored policy information for URLs that have been categorized based on content;
when the policy lookup determines that access by the requesting computer to the URL contained in the URL request is to be denied, the at least one server generating a block page in response to the determination that the URL request is to be denied, the block page containing an indication of the policy denial of the policy lookup and the block page containing an advertisement having a predefined advertisement URL, the block page having a location on a network identified by a block page URL that is distinct from a location on the network of the predefined advertisement URL; and
the at least one server redirecting the requesting computer to the block page URL by providing the block page URL to the gateway server as a response to the URL request, the block page URL being provided as part of an hypertext transfer protocol (HTTP) redirect response;
wherein performing policy lookup on the URL request comprises determining whether a credential of the requesting computer is present in an HTTP header of the URL request and, when the credential is present, obtaining the credential and determining an access level of a user associated with the credential, the access level being referenced when determining whether access to the URL contained in the URL request is to be denied.

2. The method of claim 1, further comprising logging the URL request including the URL contained in the URL request, and logging information about the user associated with the credential when the credential is present.

3. The method of claim 2, wherein the policy lookup further references a location of the requesting computer.

4. The method of claim 3, wherein the block page further contains an indication of a potential consequence of accessing the URL contained in the URL request.

5. The method of claim 4, wherein the block page further contains a user-intelligible indication of the Internet service provider.

6. The method of claim 5, wherein the advertisement and predefined URL are pre-stored and are customizable by a third party.

7. The method of claim 1, wherein the policy lookup references stored policy information for URLs that have been categorized as music.

8. The method of claim 1, wherein the policy lookup references stored policy information for URLs that have been categorized as harmful.

9. A system for applying policy to website content requests, the system comprising:

at least one server having at least one processor and a communication unit, the at least one server connected, via the communication unit over a network, to a gateway server of an Internet service provider that provides Internet access to a plurality of user computers;

the at least one server configured to obtain from the gateway server a uniform resource locator (URL) request originating from a requesting computer of the plurality of user computers;

the at least one server further configured to perform policy lookup on the URL request to determine whether access to a URL contained in the URL request by the requesting computer is to be denied, the policy lookup referencing stored policy information for URLs that have been categorized based on content;

the at least one server further configured to generate a block page in response to the determination that the URL request is to be denied, the block page containing an indication of a policy denial of the policy lookup and the block page containing an advertisement having a predefined advertisement URL when the policy lookup determines that access by the requesting computer to the URL contained in the URL request is to be denied, the block page having a location on the network identified by a block page URL that is distinct from a location on the network of the predefined advertisement URL; and the at least one server further configured to redirect the requesting computer to the block page URL by providing the block page URL to the gateway server as a response to the URL request, the block page URL being provided as part of an hypertext transfer protocol (HTTP) redirect response;

wherein the at least one server further configured to determine whether a credential of the requesting computer is present in an HTTP header of the URL request and, when the credential is present, obtain the credential and determine an access level of a user associated with the credential, the access level being referenced by the at least one server when determining whether access to the URL contained in the URL request is to be denied.

10. The system of claim 9, further comprising logging the URL request including the URL contained in the URL request, and logging information about the user associated with the credential when the credential is present.

11. The system of claim 10, wherein the policy lookup further references a location of the requesting computer.

12. The system of claim 10, wherein the block page further contains an indication of a potential consequence of accessing the URL contained in the URL request.

13. The system of claim 12, wherein the block page further contains a user-intelligible indication of the Internet service provider.

14. The system of claim 13, wherein the advertisement and predefined URL are pre-stored and are customizable by a third party.

15. The system of claim 9, wherein the policy lookup references stored policy information for URLs that have been categorized as music.

16. The system of claim 9, wherein the policy lookup references stored policy information for URLs that have been categorized as harmful.

17. A system for applying policy to website content requests, the system comprising:

a gateway server of an Internet service provider that provides Internet access to a plurality of user computers, the gateway server having at least one processor; and at least one server having a communication unit, the at least one server connected to the gateway server via the communication unit over a network, the at least one server further having at least one processor;

the at least one server configured to obtain from the gateway server a uniform resource locator (URL) request originating from a requesting computer of the plurality of user computers;

the at least one server further configured to perform policy lookup on the URL request to determine whether access to a URL contained in the URL request by the requesting computer is to be denied, the policy lookup referencing stored policy information for URLs that have been categorized based on content;

the at least one server further configured to generate a block page in response to the determination that the URL request is to be denied, the block page containing an indication of policy denial of the policy lookup and the block page containing an advertisement having a predefined advertisement URL when the policy lookup determines that access by the requesting computer to the URL contained in the URL request is to be denied, the block page having a location on the network identified by a block page URL that is distinct from a location on the network of the predefined advertisement URL; and the at least one server further configured to redirect the requesting computer to the block page URL by providing the block page URL to the gateway server as a response to the URL request, the block page URL being provided as part of an hypertext transfer protocol (HTTP) redirect response;

wherein the at least one server further configured to determine whether a credential of the requesting computer is present in an HTTP header of the URL request and, when the credential is present, obtain the credential and determine an access level of a user associated with the credential, the access level being referenced by the at least one server when determining whether access to the URL contained in the URL request is to be denied.

18. The system of claim 17, further comprising logging the URL request including the URL contained in the URL request, and logging information about the user associated with the credential when the credential is present.

19. The system of claim 17, wherein the block page further contains an indication of a potential consequence of accessing the URL contained in the URL request.

20. The system of claim 19, wherein the policy lookup references stored policy information for URLs that have been categorized as music.

21. The system of claim 19, wherein the policy lookup references stored policy information for URLs that have been categorized as harmful.

22. The system of claim 17, wherein the advertisement and predefined URL are pre-stored and are customizable by a third party.

* * * * *